(12) United States Patent
Huang et al.

(10) Patent No.: US 11,978,430 B2
(45) Date of Patent: May 7, 2024

(54) PROGRAMMABLE METASURFACE FOR REAL TIME CONTROL OF BROADBAND ELASTIC RAYS AND METHOD

(71) Applicant: The Curators of the University of Missouri, Columbia, MO (US)

(72) Inventors: Guoliang Huang, Columbia, MO (US); Yangyang Chen, Columbia, MO (US); Xiaopeng Li, Columbia, MO (US)

(73) Assignee: The Curators of the University of Missouri, Columbia, MO (US)

( * ) Notice: Subject to any disclaimer, the term of this patent is extended or adjusted under 35 U.S.C. 154(b) by 457 days.

(21) Appl. No.: 17/262,475

(22) PCT Filed: Sep. 16, 2019

(86) PCT No.: PCT/US2019/051295
§ 371 (c)(1),
(2) Date: Jan. 22, 2021

(87) PCT Pub. No.: WO2020/123003
PCT Pub. Date: Jun. 18, 2020

(65) Prior Publication Data
US 2021/0327403 A1    Oct. 21, 2021

Related U.S. Application Data

(60) Provisional application No. 62/733,269, filed on Sep. 19, 2018.

(51) Int. Cl.
*G10K 11/34* (2006.01)

(52) U.S. Cl.
CPC .......... *G10K 11/346* (2013.01); *G10K 11/348* (2013.01)

(58) Field of Classification Search
CPC ........................... G10K 11/346; G10K 11/348
See application file for complete search history.

(56) References Cited

U.S. PATENT DOCUMENTS

2012/0327502 A1* 12/2012 Zheludev ............... G02B 1/007
                                                                374/161
2018/0097284 A1*  4/2018 Liff ......................... H01Q 1/273

OTHER PUBLICATIONS

International Search Report for PCT/US2019/051295 mailed Jun. 16, 2020.
Written Opinion for PCT/US2019/051295 mailed Jun. 16, 2020.
(Continued)

*Primary Examiner* — Isam A Alsomiri
*Assistant Examiner* — Abdallah Abulaban
(74) *Attorney, Agent, or Firm* — Sandberg Phoenix & von Gontard, PC.

(57) ABSTRACT

A programmable metasurface and method is described having a plurality of parallel slits in an elastic substrate plate defining a plurality of unit cells, each having an actuator beam and a sensing beam with a slit therebetween. Each sensing beam has a pair of sensors for sensing flexural waves in the substrate. The actuator beam has a piezoelectric actuator that is controlled by a control circuit where the control circuit generates an actuator signal and where the control circuit compares the preceding actuator signal to the difference between the sensors and an electrical transfer function to result in the metasurface being able to perform a desired function.

13 Claims, 12 Drawing Sheets

(56) References Cited

OTHER PUBLICATIONS

Chen, "Broadband, Reconfigurable and Multifunctional Elastic Wave Control with Smart Metamaterials" University of Missouri Library Systems; Dec. 2017; entire document; especially p. 128-p. 150 [online] https://mospace.umsystemedu/xmlui/handle/10355/63613.

Wang et al., "Multi-resonant piezoelectric shunting induced by digital controllers for subwavelength elastic wave attenuation in smart metamaterial" Smart Mater. Struct. 26 025031; Jan. 24, 2017; entire document [online] https://lopscience.iop.org/article/10.1088/1361-665X/aa53ea/pdf.

Li, et al., "Tunable modulation of refracted lamb wave front facilitated by adaptive elastic metasurfaces" Applied Physics Letters, vol. 112, 021903; Jan. 2018; p. 1-p. 5 [online] https://doi.org/10.1063/1.5011675.

Zhu, et al., "Anomalous refraction of Acoustic Guided Waves in Solids with Geometrically Tapered Metasurfaces" American Physical Society; Physical Review Letters, vol. PRL 117, 034302; Jul. 15, 2016; p. 1-p. 6.

Liu, et al., "Source Illusion Devices for Flexural Lamb Waves Using Elastic Metasurfaces"; American Physical Society; Physical Review Letters, vol. PRL 119, 034301; Jul. 21, 2017; p. 1-p. 6.

Lee, et al., "Mass-stiffness substructuring of an elastic metasurface for full transmission beam steering"; Journal of the Mechanics and Physics of Solids; vol. 112. 2018, p. 577-p. 593.

Su, et al., "Focusing, refraction, and asymmetric transmission of elastic waves in solid metamaterials with aligned parallel gaps"; The Journal of Acoustical Society of America; vol. 139, 3386, Mar. 15, 2016, p. 3386-p. 3394; [online] https://doi.org/10.1121/1.4950770.

\* cited by examiner

PROGRAMMABLE METASURFACE FOR REAL TIME CONTROL OF BROADBAND ELASTIC RAYS AND METHOD

CROSS-REFERENCE TO RELATED APPLICATIONS

This application is a National Stage of International Application No. PCT/US2019/051295, filed Sep. 16, 2019, which claims the benefit of U.S. Provisional Application No. 62/733,269, filed on Sep. 19, 2018, the disclosures of which are herein incorporated by reference in their entirety.

STATEMENT REGARDING FEDERALLY SPONSORED RESEARCH

This invention was made with government support under AF 9550-15-1-0016 and AF 9550-18-1-0342 awarded by the United States Air Force with Program Manager Dr. Byung-Lip (Les) Lee. The government has certain rights in the invention.

FIELD OF THE DISCLOSURE

The present teachings relate to the use of metasurfaces in elastic wave control.

BACKGROUND OF THE DISCLOSURE

The statements in this section merely provide background information related to the present disclosure and may not constitute prior art.

Metasurfaces, a new kind of artificial planar metamaterials, have recently emerged as powerful approaches to create arbitrary wavefronts by arranging corresponding field discontinuities on a flat interface. Due to their relatively low loss and deep subwavelength thickness, metasurfaces have found a lot of interesting and unconventional applications in electromagnetic wave control. In recent years, this concept was rapidly introduced to acoustics, where the most notable passive design was based on the labyrinthine and coiling up space. Recently, a fully active nonlinear acoustic metasurface was proposed with real-time configurations, where the incident wave was blocked and a higher order harmonic wave was generated to the transmitted field. However, the extension of the metasurface for the control of elastic waves in solids grew up slowly. Only a few passive designs have been proposed, which can only be operated at single frequencies or narrow frequency bands, and their performances were locked into space or very difficult to alter, after the devices were fabricated. A real-time tunable broadband elastic metasurface design still remains elusive. As used in this disclosure, the term "elastic" as used with an elastic metasurface or with an elastic substrate means a material that is capable of recovering its size and shape after deformation. Some but not all examples of elastic metasurfaces or elastic substrate plates include steel, aluminum, stainless steel, other metals and certain plastics that exhibit elastic behavior.

Furthermore, guided elastic or acoustic waves have been proven to provide superior methods in probing the mechanical properties of materials and imaging invasive objects across a range of scales from lab specimen and living tissues, to civil engineering structures and subterranean reservoirs. Nonetheless, there exist challenging scenarios where the capabilities of conventional phased array techniques and metamaterial-based waveguides with spatially varying material properties are not sufficient or extremely costly. These include cases where real-time and nonreciprocal asymmetric control of elastic/acoustic ray trajectories, be they linear or curved, blocked or amplified, is desired. Although a lot of efforts have been devoted to active elastic/acoustic metamaterials to serve those purposes, the resulting designs still tend to be bulky, invasive and necessitate impractical use of complex control systems.

Metasurfaces, a new kind of artificial planar metamaterials, have recently emerged as powerful means to transform incident waves by creating arbitrarily shaped transmitted or reflected wavefronts. The transformation is accomplished by arranging suitable field discontinuities on a flat interface. Remarkably, due to dimensionality in 2D space for instance, the number of units constituting metasurface scales approximately as the square root of that necessary in a bulk metamaterial. This significant reduction in the number of constitutive units makes metasurfaces excellent substitutes for bulk metamaterials offering thin designs with manageable control systems. The concept of metasurfaces has found a lot of interesting and unconventional applications in electromagnetic wave control and subsequently spread to acoustics and elasticity. However, passive metasurfaces with non-configurable functions can only operate in narrow frequency bands, which significantly limits their use in practice.

On the other hand, active metasurfaces with reconfigurable functionalities have received considerable interests recently in optics and acoustics and became a rapidly growing field in material science and engineering. For example, by introducing voltage-controlled varactors or diodes into resonating meta-atom structures of electromagnetic metasurfaces, the effective index can be controlled locally along the metasurface to achieve the desired phase abrupt. A nonlinear reconfigurable metasurface was also proposed by blocking the incident acoustic wave and, at the same time, emitting a higher order harmonic transformed wave field. However, extensions of active acoustic metasurfaces to the control of elastic waves in solids are not straightforward and none of successful designs on active elastic metasurfaces are reported so far.

SUMMARY OF THE DISCLOSURE

The present disclosure introduces a simple platform of a programmable elastic metasurface (see FIG. 1a) and demonstrates real-time reconfigurable and multifunctional control of flexural waves in plates. As used in this disclosure, a "plate" is a smooth flat thin piece of material, usually a homogeneous continuous material that has substantially parallel faces. The disclosed metasurface comprises of a one dimensional (1D) array (e.g., a row) of a plurality of slits or other shaped openings in an elastic plate, such as a steel plate. The term "slit", as used in this disclosure preferably, but not necessarily, may be an elongate, narrow slit, but a "slit" may be of other shapes as well. These slits define a plurality of self-sensing and self-actuating unit cells with each unit cell having an actuating beam (or portion) and a sensing beam (or portion). The actuating beam of each unit cell has an actuating piezoelectric patch or actuator operatively coupled (e.g., bonded) thereto, which when energized by a control system (as will be hereinafter described), generates a desired flexural wave in the plate. The sensing beam of each unit cell has a pair of piezoelectric patches bonded thereto for sensing motion or curvature of the sensing beam. Typically, the motion of the sensing beam is induced by the incident wave as well as by excitation of the actuating beams, and/or is the result of wavefronts generated by the actuating beam actuator. Those skilled in the art will recognize that components other than a piezoelectric material may be used as actuators or sensors, such as force transducers or accelerometer sensors. Each unit cell is controlled by a simple digital circuit, which can be remotely coded or programmed through a wireless communication link. In the adopted paradigm, the local wave transmittance and phase profiles that encode the current functionality of the metasurface can be repeatedly and selectively tuned in real time with the programmed circuits to achieve different functionalities with quasi-instantaneous response times compared to the time period of the propagating waves. In this manner, and in accord with the present disclosure, real-time tunable wave steering and curvilinear trajectory adjustment can be achieved. The functionalities that can be programmed into the metasurface are not limited to single ray path control and are extended to simultaneous multifunctional wave control. To further exemplify the range of functionalities that can be attained with the system and method of the present disclosure, a one-way non-reciprocal wave transmission is disclosed. In this configuration, the metasurface blocks waves incident in a given direction while amplifying waves incident in the opposite direction. Lastly, operability in broadband frequency ranges has been investigated and is herein disclosed. The programmable elastic metasurface of the present disclosure significantly enhances elastic wave control techniques in a way that benefits the fields of structural health monitoring and ultrasonic imaging, especially in complex heterogeneous structures, and in active and unidirectional noise cancellation and stealth technologies.

Programmable elastic metasurface in accordance with this disclosure comprises a substrate plate having a plurality of slits therein defining a plurality of self-sensing and self-actuating unit cells. Each unit cell comprises an actuating beam, a sensing beam, and a slit therebetween. Each actuating beam has a piezoelectric actuator operatively coupled thereto which when energized generates a coherent flexural wave in the substrate plate. The sensing beam has a pair of piezoelectric sensors operatively coupled thereto for sensing incident flexural waves induced by an external source. As used in this disclosure, the term "external source" or "external force" will be understood to mean be any kind of source used to generate flexural waves in the elastic substrate. This source could be, but is not limited to, force transducers, shakers, piezoelectric patches.

The flexural wave has an amplitude and phase that are changed after passing through the metasurface. A control circuit, preferably one control circuit for each actuator beam, is provided for controlling energization of the actuating beam actuators where the control circuit receives signals from the sensing beam sensors corresponding to the flexural waves induced by an external source on the substrate plate and by actuating beam actuators in the metasurface. The control circuit takes the difference between the signals from each of the sensing beam sensors for a respective sensing beam so as to substantially eliminate flexural wave signals induced by the actuating beam actuator on the metasurface and so as to obtain an incident flexural wave signal induced by the external source on the substrate plate. The control circuit generates a desired actuating signal for varying the actuation of the actuating beam actuator so as to change the amplitude and phase of the incident flexural wave to desired values of the flexural wave generated by the external source in the substrate plate after passing through the metasurface. The control circuit compares the last—the desired actuating signal to the difference between the pair of sensing signals and a desired electrical transfer function thereby to result in the metasurface being able to perform its desired function. It will be understood that an electrical transfer function is a function that defines the relation between the output signal(s) and input signal(s), which is the output as a function of the frequency of the input signal.

More specifically, the desired function may be the functionality of the metasurface, such as wave steering, simultaneous wave focusing and steering or one-way non-reciprocal wave blocking or cloaking. It will be understood that in order to achieve these desired functions, a "desired" local transmission coefficient which includes the phase difference mentioned and amplitude difference of the transmitted and incident waves after the incident wave passes through the metasurface. It will be understood that the obtained from the generalized Snell's Law by given a specific desired functionality, i.e., wave steering angle.

Real-time engineering of elastic rays in solid materials is crucial for several applications relevant to active noise and vibration cancellation and relevant to inverse methods aiming to either reveal or dissimulate the presence of foreign bodies. The present disclosure describes programmable elastic metasurface with sensing-and-actuating units, allowing it to adapt and reprogram its wave control functionalities in real time. The active units behave following decoupled "feed forward" sensor-to-actuator control loops governed by local transfer functions encoded into a digital circuit and offering highly flexible phase and amplitude engineering of transmitted and/or scattered waves. The metasurface of the present disclosure is concretized numerically and experimentally by achieving, real-time tunable ray steering of flexural waves in a host plate. Various other significant demonstrations have been included to illustrate the multifunctional adaptability of the design. In particular, the capability of one-way non-reciprocal blocking of waves has been observed experimentally. Finally, operability across broad wave frequency ranges (e.g., about 5 kHz-45 kHz) has been demonstrated. Designs in accord with the present disclosure will pave a new and efficient way in the field of sensing and actuation of elastic waves.

In various embodiments, the present disclosure provides a programmable elastic metasurface and exemplarily demonstrates the real-time multifunctional control of flexural waves on a substrate, for example on a steel plate as shown in FIG. 1a. The metasurface comprises self-sensing-and-actuating units with a one-dimensional array of piezoelectric patches (e.g., sensors) bonded on a plate (FIG. 1b), which are individually controlled by simple digital circuits (FIG. 1b). In accord with the present disclosure, the local wave transmittance and phase along the metasurface can be independently tuned with programs in circuits. By reconfiguring phase profiles along the metasurface within different time periods, real-time tunability of different functionalities of the programmable metasurface, such as different wave steering and trajectory control, are now achieved. Still further in accord with the present disclosure, a programmable metasurface with specifically designed transfer functions in a digital controller can achieve some unusual wave transformations which, heretofore, have not been demonstrated or were extremely difficult to realize, with a simple passive design, which may include simultaneous multifunctional wave control, nonreciprocal wave propagation, operation at broadband frequencies and enhanced tunable imaging of a point source (See FIGS. 9a-f,e-1i, FIGS. 11a-e). The programmable elastic metasurface of the present disclosure has uses in elastic wave control including such wave engineering, such acoustics and optics.

This summary is provided merely for purposes of summarizing various example embodiments of the present disclosure so as to provide a basic understanding of various aspects of the teachings herein. Various embodiments, aspects, and advantages will become apparent from the following detailed description taken in conjunction with the accompanying drawings which illustrate, by way of example, the principles of the described embodiments. Accordingly, it should be understood that the description and specific examples set forth herein are intended for purposes of illustration only and are not intended to limit the scope of the present teachings or of the claims of this disclosure.

BRIEF DESCRIPTION OF THE DRAWINGS

The drawings described herein are for illustration purposes only and are not intended to limit the scope of the present teachings in any way.

FIG. 5a illustrates steering elastic rays to 33° during a first time interval;

FIG. 5b illustrates steering elastic rays to 50° during a second time interval;

FIG. 5c illustrates steering elastic rays to 72° during a third time interval;

FIG. 5d illustrates a parabolic ray path during a fourth time interval, where for FIGS. 5a-5d the right-going plane incident wave is generated by an array of piezoelectric patches, and on the numerical plots, the regions framed in white correspond to zones where experimental measurements were obtained, and where black arrows and curved line represent the desired elastic ray direction and trajectory determined analytically;

FIG. 8b illustrates wave transmittance induced by a metasurface of the present disclosure with the fitted fourth order transfer function, where FIG. 8c illustrates wave phase change induced by the metasurface with the fitted fourth order transfer function, and where FIG. 8d illustrates numerically calculated and analytically predicted refractive angles of transmitted waves from the metasurface at different frequencies with the frequency-adaptive amplification factor.

FIG. 10a illustrates focusing elastic rays at $x_0=100$ mm, $y_0=50$ mm, and where FIG. 10b illustrates steering elastic rays to −50°, FIG. 10c is a plot identical to the superposition of the two plots of FIGS. 10a and 10b;

FIGS. 11c, 11d are at the same location (e.g., 120 mm.) with amplification ratios of 5 and 10, respectively, and where FIG. 11e illustrates the magnitude of the normalized out-of-plane displacement field at x=120 mm. with different amplification ratios; FIG. 12a illustrates a numerically simulated and experimentally measured out-of-plane velocity fields for right-going incident waves with the incident wave being nearly totally blocked, where FIG. 12b illustrates a numerically simulated and experimentally measured out-of-plane velocity fields for left-going incident waves, where FIG. 12c illustrates numerically simulated amplitude and phase of the displacement for right-going incident waves, and where FIG. 12d illustrates numerically simulated amplitude and phase of the displacement for left-going incident waves.

Corresponding reference characters indicate corresponding parts throughout the several views of the drawings.

DESCRIPTION OF PREFERRED EMBODIMENTS

Figure 1:
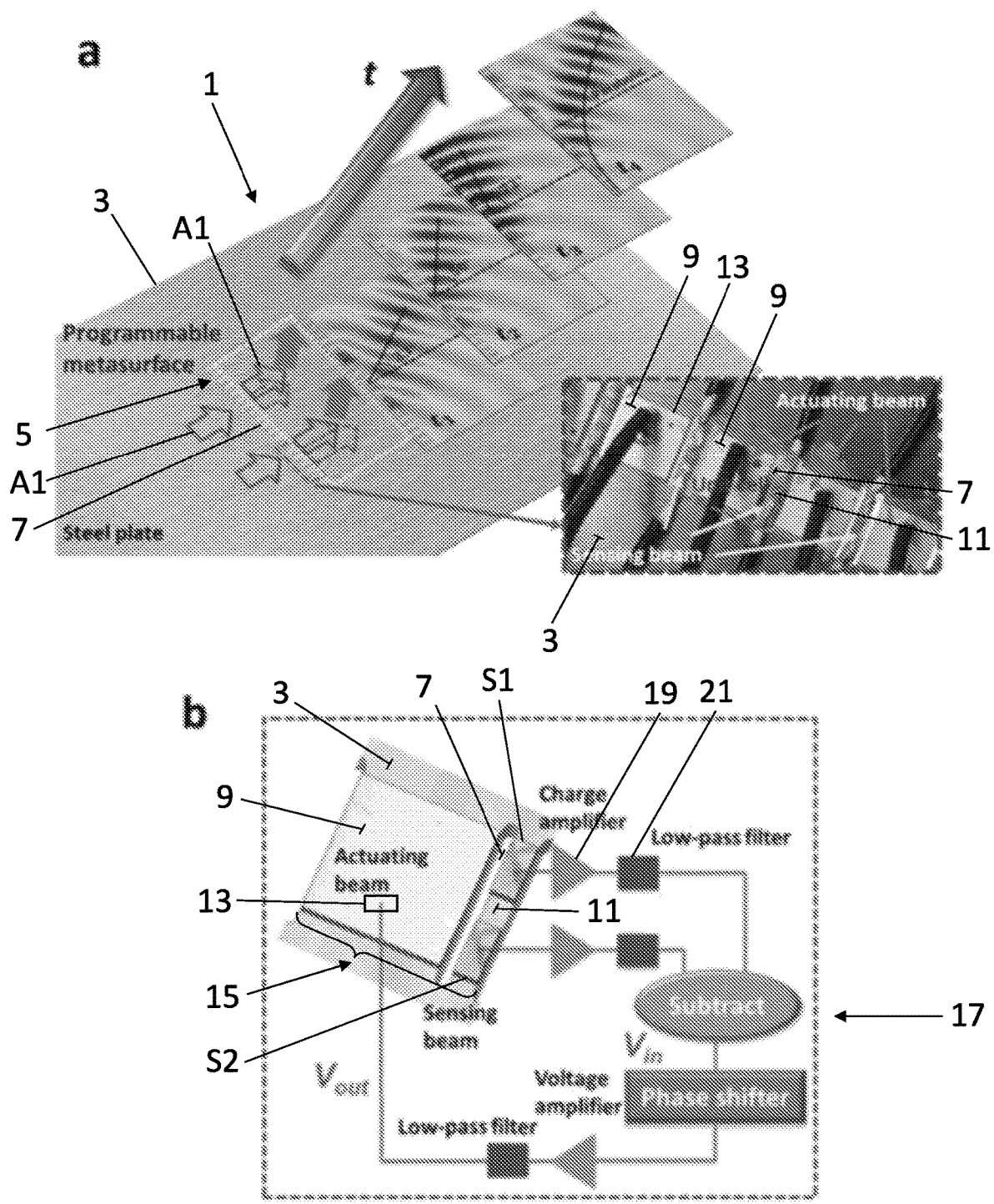
FIG. 1a is a schematic of a programmable metasurface of the present disclosure illustrating real-time elastic ray control incorporated on a substrate comprising a series of slits in the substrate arranged in a row of unit cells with each cell comprising an actuating beam and a sensing beam with a slit therebetween to result in a programmable metasurface, with the photographic insert of FIG. 1a illustrating a series of unit cells as arranged on the substrate.
FIG. 1b diagrammatically illustrates a unit cell where the actuating beam is energized by a programmable digital control circuit to generate a wavefront to metasurface on the substrate and to the sensing beam of the unit cell, the sensing beam having a pair of sensors mounted thereon generating signals that serve as the input to a control circuit.

The following descriptions are of the apparatus and methods of the present disclosure are merely exemplary in nature and is in no way are intended to limit the present teachings, applications, or uses. Throughout this specification, like reference numerals will be used to refer to like elements. Additionally, the embodiments disclosed below are not intended to be exhaustive or to limit the invention to the precise forms disclosed in the following detailed description. Rather, the embodiments are chosen and described so that others skilled in the art can utilize their teachings. As well, it should be understood that the drawings are intended to illustrate and plainly disclose presently envisioned embodiments to one of skill in the art, but are not intended to be manufacturing level drawings or renditions of final products and may include simplified conceptual views to facilitate understanding or explanation. As well, the relative size and arrangement of the components may differ from that shown and still operate within the spirit of the invention.

As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims.

Unless otherwise defined, all technical and scientific terms used herein have the same meaning as commonly understood by one of ordinary skill in the art at the time of filing of this patent application to which this disclosure pertains. The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps can be employed.

When an element, object, device, apparatus, component, region or section, etc., is referred to as being "on," "engaged to or with," "connected to or with," or "coupled to or with" another element, object, device, apparatus, component, region or section, etc., it can be directly on, engaged, connected or coupled to or with the other element, object, device, apparatus, component, region or section, etc., or intervening elements, objects, devices, apparatuses, components, regions or sections, etc., can be present. In contrast, when an element, object, device, apparatus, component, region or section, etc., is referred to as being "directly on," "directly engaged to," "directly connected to," or "directly coupled to" another element, object, device, apparatus, component, region or section, etc., there may be no intervening elements, objects, devices, apparatuses, components, regions or sections, etc., present. Other words used to describe the relationship between elements, objects, devices, apparatuses, components, regions or sections, etc., should be interpreted in a like fashion (e.g., "between" versus "directly between," "adjacent" versus "directly adjacent," etc.).

As used herein, the term "and/or" includes any and all combinations of one or more of the associated listed items. For example, A and/or B includes A alone, or B alone, or both A and B.

Although the terms first, second, third, etc. can be used herein to describe various elements, objects, devices, apparatuses, components, regions or sections, etc., these elements, objects, devices, apparatuses, components, regions or sections, etc., should not be limited by these terms. These terms may be used only to distinguish one element, object, device, apparatus, component, region or section, etc., from another element, object, device, apparatus, component, region or section, etc., and do not necessarily imply a sequence or order unless clearly indicated by the context.

Moreover, it will be understood that various directions such as "upper", "lower", "bottom", "top", "left", "right", "first", "second" and so forth are made only with respect to explanation in conjunction with the drawings, and that components may be oriented differently, for instance, during transportation and manufacturing as well as operation. Because many varying and different embodiments may be made within the scope of the concept(s) taught herein, and because many modifications may be made in the embodiments described herein, it is to be understood that the details herein are to be interpreted as illustrative and non-limiting.

The apparatuses/systems and methods described herein can be implemented at least in part by one or more computer program products comprising one or more non-transitory, tangible, computer-readable mediums storing computer programs with instructions that may be performed by one or more processors. The computer programs may include processor executable instructions and/or instructions that may be translated or otherwise interpreted by a processor such that the processor may perform the instructions. The computer programs can also include stored data. Non-limiting examples of the non-transitory, tangible, computer readable medium are nonvolatile memory, magnetic storage, and optical storage.

As used herein, the term module can refer to, be part of, or include an application specific integrated circuit (ASIC); an electronic circuit; a combinational logic circuit; a field programmable gate array (FPGA); a processor (shared, dedicated, or group) that performs instructions included in code, including for example, execution of executable code instructions and/or interpretation/translation of uncompiled code; other suitable hardware components that provide the described functionality; or a combination of some or all of the above, such as in a system-on-chip. The term module can include memory (shared, dedicated, or group) that stores code executed by the processor.

The term code, as used herein, can include software, firmware, and/or microcode, and can refer to one or more programs, routines, functions, classes, and/or objects. The term shared, as used herein, means that some or all code from multiple modules can be executed using a single (shared) processor. In addition, some or all code from multiple modules can be stored by a single (shared) memory. The term group, as used above, means that some or all code from a single module can be executed using a group of processors. In addition, some or all code from a single module can be stored using a group of memories.

Figure 2:
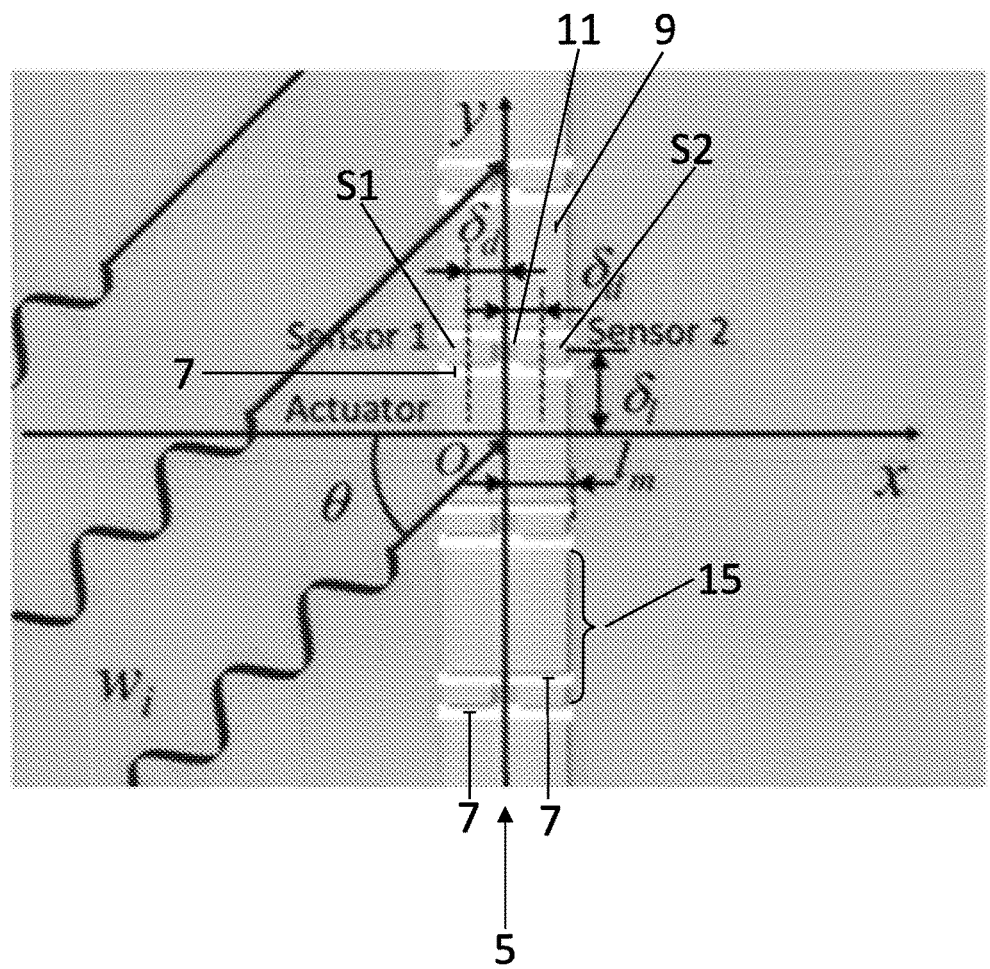
FIG. 2 is a schematic of a harmonic wave analysis of the metasurface of the present disclosure with oblique incidence.

Referring to FIG. 1a, a programmable metasurface of the present disclosure is indicated in its entirety at 1 and illustrates a real-time elastic ray control in accord with the present disclosure. The metasurface 1 comprises a thin steel plate (or other suitable substrate material) 3 having a row 5 of slits 7 spaced at regular intervals in the substrate defining (as best shown in FIGS. 1a, 1b and 2) alternating actuating beams 9 and sensing beams 11 with a slit 7 therebetween. As best shown in FIG. 1b, the actuating beam 9 is preferably, but not necessarily, wider than sensing beam 11. Sensing beam 11 has a pair of sensors, as indicated at S1, S2, affixed thereto. These sensors on the sensing beam are preferably piezoelectric patches bonded (or otherwise operatively coupled) to the sensing beam and they are placed symmetrically with respect to the metasurface. Each actuating beam 9 has a piezoelectric patch located at the mid-thickness of the metasurface that serves as an actuator 13 (as shown in FIGS. 1b and 4c), which generates a coherent wave based on the sensing signal to control both the amplitude and phase of the transmitted wave in the plate through constructive and/or destructive wave interferences with the incident wave (as the arrows shown in FIG. 1a).). As shown in FIG. 1b, one of the actuating beams 9 and one of the sensing beams 11 with a slit 7 therebetween constitute a unit cell 15. The function of the metasurface 1 is to transform incident waves passing through the metasurface. The incident wave is excited by external sources, such as by the actuators 27 located on the plate but outside of the metasurface MS or 1, as shown in FIG. 4a, and is denoted by arrows A1 in FIG. 1a. A "coherent wave" is one having a constant phase relationship. The dimensions for the slits 7, the actuating beams 9, and the sensing beams 11 are shown in FIG. 3a, and are specified for one example in Table 1, below. The thickness of the substrate plate 3 may vary between about 0.1—to about 10 mm or more depending on the application. The size of the actuator beams and of the sensing beams can range between about 0.1-100 mm or more, depending on the application as will be apparent to those skilled in the art. Further, those skilled in the art will recognize that these dimensions and the plate thicknesses can be scaled up or down depending on many factors, including the frequency range of interest.

Thus, sensing beams 11 will extract the background incident wave signal based on which, through a "feedforward" control loop, the actuating beams will generate coherent waves thus allowing, by constructive and/or destructive interference, to control both the phase and amplitude of the transmitted wave. One actuating beam 9 and an adjacent sensing beam 11 with a slit 7 therebetween form a unit cell 15. A plurality of these unit cells are linearly arranged in a row 5 on substrate 3.

Sensors S1, S2 and actuator 13 of each unit cell 15 communicate through a respective digital-circuit control system 17, as shown in FIG. 1b. For each unit cell, the output signal of each of its sensors S1, S2 is connected to a respective charge amplifier 19 and to a respective low-pass band filter 21. The filtered voltage signals coming from the sensors contain contributions from both the incident wave and the coherent waves generated by the actuators. Subtracting the output signals of each pair of sensors yields an input signal, Vin, where, due to mirror symmetry, the contribution of generated coherent waves has been eliminated and only the contribution of the background incident signal is retained. Those skilled in the art will appreciate that the subtraction operation not only removes intra-cell actuator-to-sensor feedback effects but also eliminates inter-cell effects as well. This decoupling ensures that the metasurface functionality can be programmed locally unit cell by unit cell and thus greatly reduces the complexity of the underlying electrical control system. Further, it has been found that scattering of waves by the piezoelectric patches at subwavelength scales is weak and thus can be ignored. In accordance with the present disclosure, metasurface 1 can be programmed to block waveforms in substrate 3 in a given direction while amplifying waveforms incident in the opposite direction so as to result in mechanical diode. Those skilled in the art will appreciate that a "mechanical diode" is a mechanical device that has a one-way, non-reciprocal wave blocking or one-way wave propagating function.

In this disclosure, the Kirchhoff plate theory is adopted for the frequency range of interest to the metasurface, because the wavelength is much larger than the thickness of the plate ($\lambda/h \approx 18$ at 10 kHz), where the thickness shear deformation effect can be ignored. The governing equation of flexural waves in a homogeneous isotropic plate can be expressed as $$D\nabla^2(\nabla^2 w) + \rho h \frac{\partial^2 w}{\partial t^2} = 0, \quad (1)$$

where $\rho$ and h represent the mass density and thickness of the plate, and $$\nabla^2 = \frac{\partial^2}{\partial x^2} + \frac{\partial^2}{\partial y^2}, D = \frac{Eh^3}{12(1-v^2)}$$

with E and v being, respectively, the Young's modulus and Poisson's ratio of the host plate (substrate) material.

For the metasurface 1 of the present disclosure with deep subwavelength thickness, the effects of cut slits 7 and corresponding free boundaries can be ignored and consider the metasurface without the control together with the host plate as a continuous plate. The accuracy of the assumption has been verified by our numerical simulations with both normal and oblique incidences. The incident plane wave in the host plate and sensing and actuating beams is assumed as $$w_i = w_0 e^{ik(x\cos\theta + y\sin\theta)}, \quad (2)$$

$$k = \left(\frac{\rho h \omega^2}{D}\right)^{1/4}$$

where $\theta$ represents the incident angle as shown in FIG. 2, the wavenumber and $w_0$ represents the complex wave amplitude. It should be noted that the reflection due to the presence of cut slits and surface-bonded piezoelectric plates are ignored because of their subwavelength dimensions and small impedance mismatch.

Based on Kirchhoff plate theory, the strain fields on the top electrodes of the piezoelectric sensors along x- and y-directions are written as $$\varepsilon_x = k^2 \cos^2\theta w_0 \tilde{h}_p e^{ik(x\cos\theta + y\sin\theta)}, \quad (3a)$$

$$\varepsilon_y = k^2 \sin^2\theta w_0 \tilde{h}_p e^{ik(x\cos\theta + y\sin\theta)}, \quad (3b)$$

in which $\tilde{h}_p$ represents the distance between the upper surface of the piezoelectric plate to the neutral plane of the sensor beam. Here, we select a unit cell located at the origin. The voltage signal acquired from the charge amplifier connected with "Sensor 1" (FIG. 2) can be expressed as $$V_1 = \frac{Q_1}{C_0}, \quad (4)$$

where the free charge on the electrode $Q_1 = \int_{S_1} -e_{31}(\varepsilon_x + \varepsilon_y)dS$, with e31 being the piezoelectric constant, and $C_0$ denotes the reference capacitance in the charge amplifier. It should be mentioned that this signal only represents the incident wave component. The coherent wave components generated by metasurface actuators will be cancelled out by the subtraction operation between the two sensors.

Inserting equation (3) into equation (4), we have $$V_1 = \kappa_s A w_0 e^{ik(-\delta_d\cos\theta + \delta_l \sin\theta)}, \quad (5)$$

where $$\kappa_s = \frac{e_{31}\tilde{h}_p}{C_p^T \cos\theta \sin\theta}\left(e^{\frac{ikh_s\cos\theta}{2}} - e^{-\frac{ikh_s\cos\theta}{2}}\right)\left(e^{\frac{ikb_s\sin\theta}{2}} - e^{-\frac{ikb_s\sin\theta}{2}}\right) \text{ and}$$

$$A = \frac{C_p^T}{C_0}$$

denoting the amplification ratio of the charge amplifier with $C_p^T$ being the capacitance of the piezoelectric sensor at constant stress. Similarly, the voltage signal acquired from the charge amplifier of sensor S2 can be written as $$V_2 = \kappa_s A w_0 e^{ik(\delta_d\cos\theta + \delta_l \sin\theta)}. \quad (6)$$

According to the design principles of the present disclosure, as generally described above, the input signal, Vin, attained from the two sensors is $$V_{in} = V_1 - V_2 = -2i\kappa_s A w_0 \sin(k\delta_d \cos\theta)e^{ik\delta_l \sin\theta}. \quad (7)$$

The output signal from the electrical control system, $V_{out} = HV_{in}$, is then applied across the corresponding actuator in the metasurface unit cell, which generates two coherent waves propagating to both sides of the metasurface. It will be understood that the output signal is equal to a transfer function times the input signal. That is to say once we know what kind of output signal we want, and what is the input signal through direct measurements, we can obtain the transfer function by just dividing the output signal by the input signal.

Due to the symmetric conditions (all the unit cells are assumed with the same transfer function), the wave field in the right-hand-side of the metasurface, which is proportional to the voltage, Vout, can be assumed as $$w_a = i\kappa_a V_{out} e^{ik(x\cos\theta + y\sin\theta)}, x > l_m, \quad (8)$$

where $\kappa_a$ is defined as the electromechanical coupling coefficient of the piezoelectric actuator that will be determined numerically due to the complex geometries and $-60° < \theta < 60°$. As used in this disclosure, the term "electromechanical coupling" means coupling between the mechanical structure of the substrate plate and the piezoelectric patch. Finally, the total transmitted wave field is $$w_t = [1 + 2\kappa_a \kappa_s A H \sin(k\delta_d \cos\theta)e^{ik\delta_l \sin\theta}] w_0 e^{ik(x\cos\theta + y\sin\theta)}. \quad (9)$$

It can be found from equation (9) that both the amplitude and the phase of the transmitted wave can be independently controlled by the transfer function.

The local transfer function H defined as the ratio of the output voltage applied across the actuator to the input signal Vin summarizes the function of a single unit cell. Its design is informed by the following analysis. For transmission-type metasurfaces with only phase engineering, the transmittance is usually designed to be unitary, therefore, $$H = \frac{|t|e^{i\phi} - 1}{2\kappa_a \kappa_s A \sin(k\delta_d \cos\theta)e^{ik\delta_l \sin\theta}} = C(|t|e^{i\phi} - 1), \quad (10)$$

in which $\phi$ is the desired phase abrupt induced by the metasurface and the amplification ratio $C = 1/[2\kappa_a \kappa_s A \sin(k\delta_d \cos\theta)e^{ik\delta_l \sin\theta}]$.

As a special case, for the metasurface with normal incidence, the transfer function will become $$H = \frac{e^{i\phi} - 1}{2\kappa_a \kappa_s A \sin(k\delta_d)} = C(e^{i\phi} - 1), \quad (11)$$

where $C = 1/[2\kappa_a \kappa_s A \sin(k\delta_d)]$. Due to the geometric complexity, the constant, C, is extremely difficult to be determined analytically. A numerical approach is then applied.

In order to achieve the transfer function of equation (10), phase shifter and voltage amplification circuits are constructed and are shown in FIG. 1b. Note that a unitary transmittance does not mean that no extra elastic energy is radiated in the direction of the incident wave. In fact, the phase jump of the transmitted wave is purely caused by the elastic energy input from the electrical domain. For the transmission-type metasurface, only the transmitted half of that energy is useful whereas the backscattered half is lost.

It has already been noticed that the internal amplification factor C (equation (2)) implemented in the electrical system 15 of the metasurface 1 depends on the incident wave angles. However, for practical applications, the incident angle is usually unknown for the metasurface. To address the issue, two approaches are further quantitatively analyzed to illustrate the applicability of the metasurface under oblique incidences including: (1) the amplification factor for the normal incidence $C(\theta=0)=C_0=1/[2\kappa_a\kappa_s A \sin(k\delta_d)]$ is used by ignoring effects of the oblique angles, which will be discussed below. A modified control design in the electric system is suggested to exactly compensate the effect of the oblique angle on the metasurface, which will be discussed below.

Figure 3:
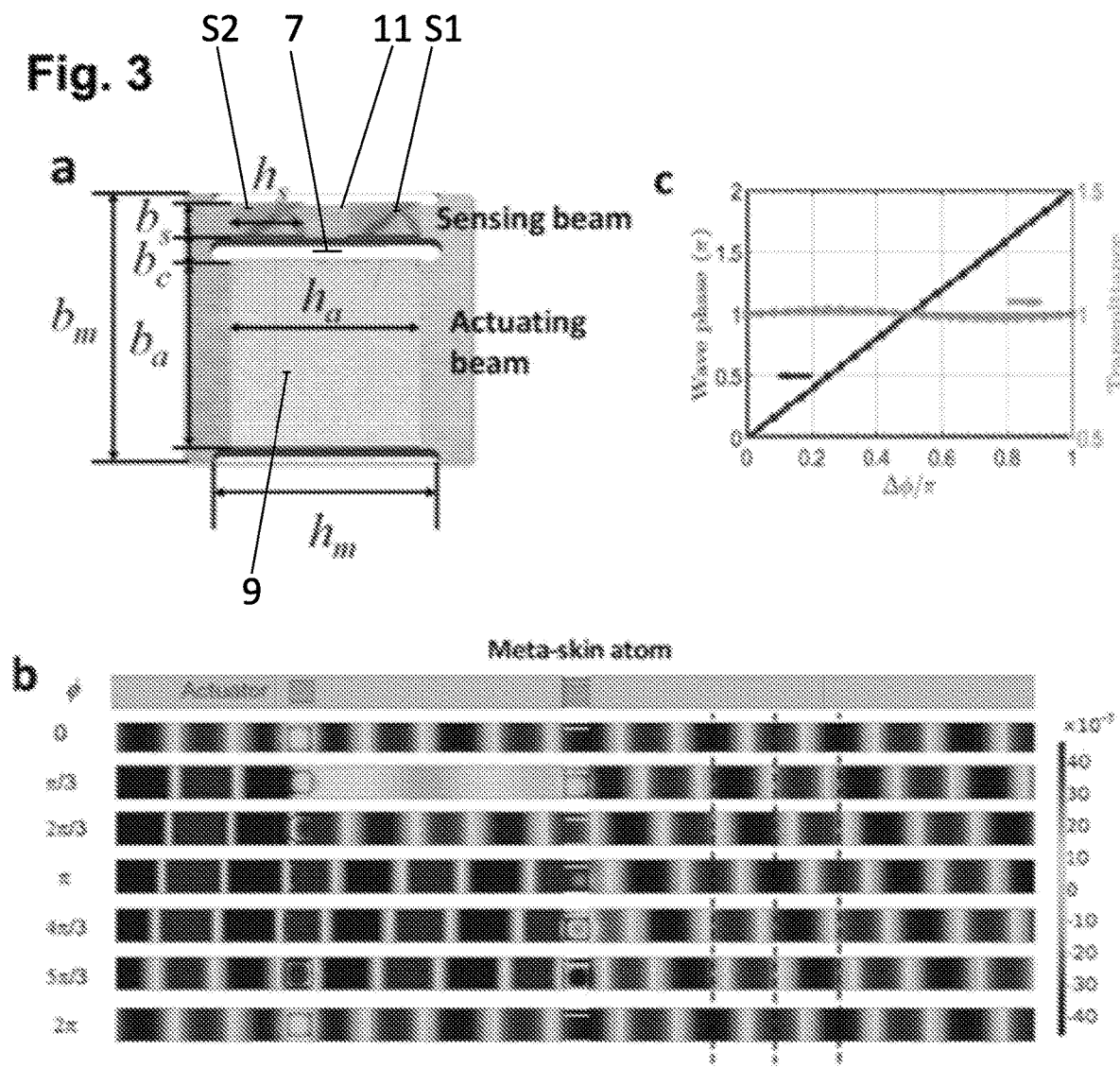
FIG. 3a illustrates a unit cell with its geometric or dimensional parameters of a transmission-type of programmable metasurface in accord with the present disclosure, with these exemplary geometric or dimensional parameters being disclosed in Table 1.
FIG. 3b illustrates out-of-plane displacement wave field manipulated by a programmable metasurface of the present disclosure with different phase abrupt in simulations.
FIG. 3c is a graph illustrating wave transmittance and induced phase jump determined analytically and numerically for a single unit cell in a quasi-1D setting.
Figure 4:
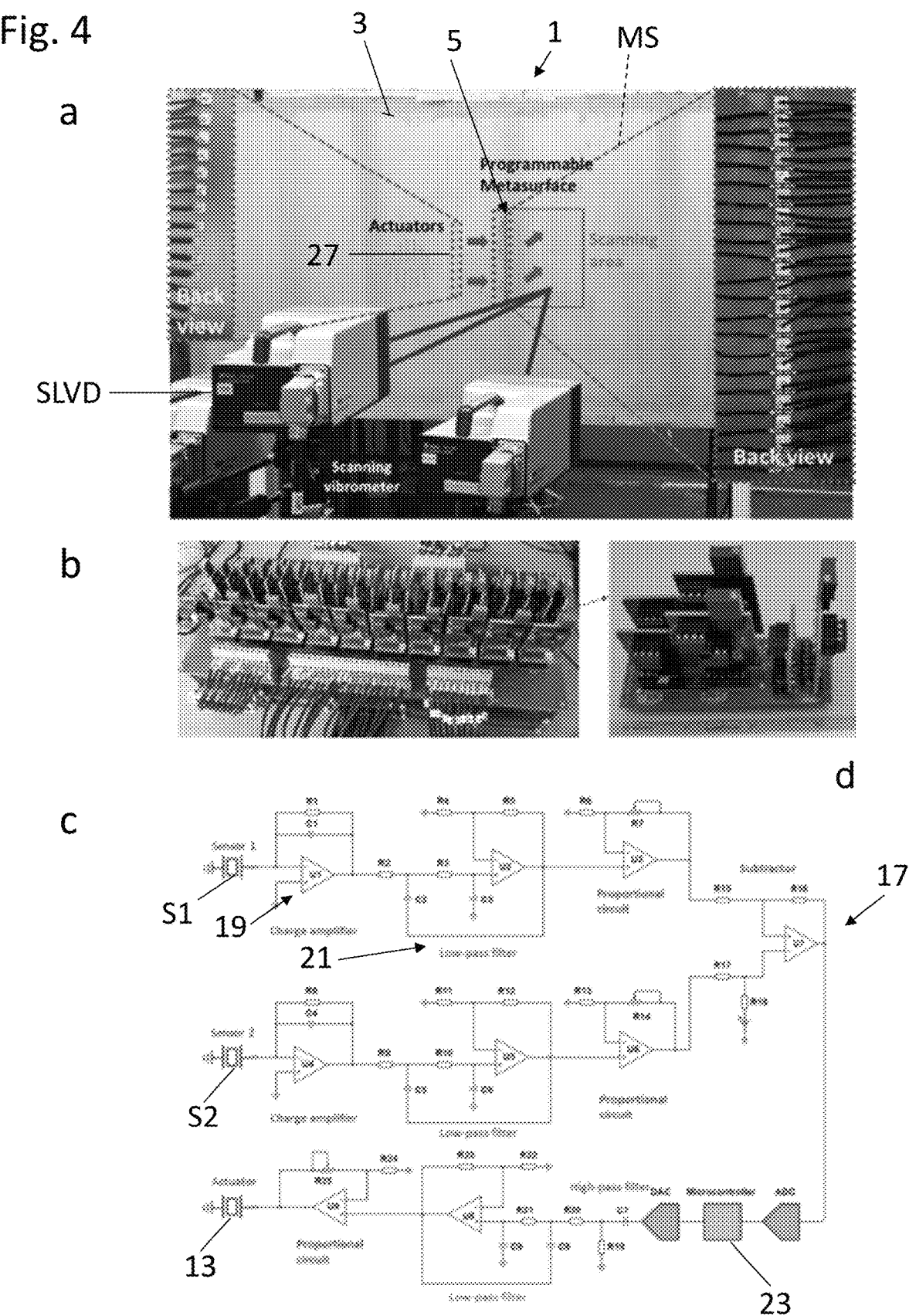
FIG. 4a is view of an experimental setup of a programmable metasurface in accord with the present disclosure having a plurality of unit cells on a substrate, such as a steel plate, utilizing one or more scanning vibrometers to detect the wavefronts in a scanning area of the substrate generated by a plurality of unit cells.
FIG. 4b is a photograph that illustrates a plurality of programmable control circuits for controlling a plurality of unit cells.
FIG. 4c illustrates an electrical schematic for one of the programmable control circuits shown in FIG. 4b.
FIG. 4d is a photograph of one of the programmable control circuit, as shown in FIG. 4b, for one unit cell where the components shown are listed in Table 2.

Piezoelectric-coupled 3D numerical simulations were performed to validate the phase control abilities of a single unit cell at 10 kHz (see FIG. 3). Therein, the top and bottom boundaries of the simulated domain are set to be symmetric and constant $C_0$ is determined numerically. Geometric parameters are illustrated in FIG. 3(a) with the values listed in Table 1, below. The thickness of the host steel plate 3 is selected as 3.0 mm and the thicknesses of actuator and sensor beams or patches 9, 11, are 1.0 mm and 1.1 mm, respectively. As shown on the top portion in FIG. 3b, the top and bottom boundaries of the simulated domain are set to be symmetric. The out-of-plane displacement wave field in FIG. 3b illustrates that the phase change introduced into the transmitted wave is almost exactly the same, with the phase, $\phi$, prescribed in the simulation by using equation (11), where $\phi=0$, $\pi/3$, $2\pi/3$, $\pi$, $4\pi/3$, $5\pi/3$, and $2\pi$, respectively. It can also be found from the figure that amplitudes of transmitted waves among all the cases are almost identical. FIG. 3(c) summaries this behavior, where analytical predictions based on equation (10) (dashed lines) as well as simulated values (solid curves) of the phase and transmittance are plotted against one another and show satisfactory agreement. The results illustrate how full phase control of the transmitted wave from 0 to 2Π altogether while uniformly maintaining nearly unitary transmittance can be achieved simply by programming the electrical system within a unit cell. The small fluctuations in the simulated transmittance are caused by weak reflections due to the presence of sensors and actuators on the plate.

TABLE 1

Geometric parameters (e.g., dimensions) of the transmission-type programmable metasurface 1.

| $b_s$ | 1.75 mm | $b_m$ | 14.0 mm | $h_s$ | 3.9 mm | $h_m$ | 11.0 mm |
|---|---|---|---|---|---|---|---|
| $b_c$ | 1.25 mm | $b_a$ | 10.0 mm | $h_a$ | 10.0 mm | | |

Sample Fabrications and Experimental Setup

FIG. 4a shows the fabricated metasurface 1 as well as the experimental setup for wave field measurements. To fabricate the corresponding actuating and sensing beams 9, 11, a periodic array of thin slits 7 was cut by a fiber laser cutting machine on a steel plate 3 measuring 1 m×2 m×3 mm. An array of piezoelectric plates or patches (APC 850, APC 855) was then bonded on the surfaces of those sensing and actuating beams by a conductive epoxy commercially available from www.chemtronics.com to comprise those sensors S1, S2 and actuator 13 for each unit cell 15. As shown in FIG. 4a, a programmable metasurface MS is defined having 20 unit cells 15 is shown, but other numbers may be used in accord with this disclosure. Another array of piezoelectric plates or patches (APC 850), as indicated at 27, was bonded to the left-hand-side 120 mm away from the metasurface MS to generate normally incident plane flexural waves. To produce an incident plane wave, a 10-peak tone burst signal with central frequency being 10 kHz was generated by a Tektronix AFG3022C arbitrary waveform generator and amplified by a Krohn-Hite high voltage power amplifier, which was finally applied across the actuator array in the left-hand-side of the metasurface. The transmitted out-of-plane velocity wave field in the scanning area was measured by a Polytec PSV-400 scanning laser Doppler vibrometer, as indicated at SLDV and as shown in FIG. 4a.

In the metasurface 1 of the present disclosure, each of the metasurface unit cells 15 have an individual circuit control system 17, which was divided into several small parts with specifically assigned functions, e.g., charge and voltage amplifiers, low-pass filters and microcontrollers. All the circuits were fabricated on printed circuit boards, and finally assembled into two large boards for all the 20 unit cells. FIG. 4b shows the fabricated circuits for 10 unit cells, where all the analog circuits were placed on the upper layer and all the digital circuits were located on the lower layer. In particular, the diagram of the control circuit in a metasurface unit cell is shown in FIG. 4c with the circuit parameters given in Table 2, below. As shown in FIG. 4c, three low-pass filters were implemented into a metasurface unit cell 19. In the circuit design, two second-order Sallen-Key low-pass filters were connected to the two sensors S1, S2, respectively, and were used to remove high-frequency noises from the sensing signals. Here, the cutoff frequency was tuned to 26.5 kHz such that signals sending to the microcontroller shown in FIG. 4c can possess high signal-to-noise-ratios (SNRs), and therefore the original sensing signal centered at 10 kHz would not be distorted. In addition, another second-order Sallen-Key low-pass filter was connected to the actuator aimed to suppress high-frequency noises from the microcontroller due to the discrete sampling. The cutoff frequency was still tuned to 26.5 kHz for the same reason. Last, it should mention that the sensing feedback components from actuating have been theoretically suppressed through the subtraction operation. However, in real experiments, there still exist weak sensing feedback components from actuating caused by the fabrication errors, circuit inaccuracies and boundary reflections. Those components could become relatively strong and induce high-frequency unstable modes. The low-pass filters can also efficiently eliminate those unwanted components and stabilize the entire control system.

TABLE 2

Circuit parameters (components) of the fabricated control circuit system.

| R1, R8 | 1 MΩ | R2, R3, R9, R10, R20, R21 | 3 kΩ | R4-R6, R11-R13, R15-R18, R22-R24 | 1 kΩ | R19 | 14.7 kΩ |
|---|---|---|---|---|---|---|---|
| R7, R14 | 0-10 kΩ | R25 | 0-100 kΩ | C1, C4 | 100 pF | C2, C3, C5-C9 | 2 nF |
| U1-U7 | OPA604 | U8, U9 | OPA445 | Micro-controller 23 | | STM32F405 | |

The micro-controller 23 is preferably a STM32F405 microprocessor commercially available from STMicroelectronics of Geneva, Switzerland that can be programmed and controlled wirelessly so as to tune the control circuit and thus the metasurface 1 in real time.

Real-Time Tunable Steering of Rays

The key component of wave manipulation circuits is the transfer function profile H=H(y) controlling the wave transmission properties of the metasurface as a whole where y is the local position of the individual unit cell along the metasurface. For instance, the generalized Snell's law dictates that the refraction angle $\theta_t$ of the transmitted wave is related to the phase gradient $$\frac{\Delta \phi}{\Delta y}$$

according to $$\sin\theta_t = \frac{\Delta \phi}{k \Delta y}$$

with normal incidence. As a special case, a linear phase profile implies that the transmitted wave has uniform and rectilinear ray paths. In other words, the refraction angle $\theta_t$ can also be determined by $$\sin\theta_t = \frac{\lambda}{\Delta d},$$

where $\Delta d$ is the distance along the metasurface across which the prescribed phase changes by $2\pi$ and $\lambda$ is the operating wavelength. To achieve the linear phase jump profile $\phi(y)$, i.e.

$$\phi_1 = 0, \phi_2 = \frac{\pi}{4}, \phi_3 = \frac{\pi}{2}, \phi_4 = \frac{3\pi}{4}, \phi_5 = 2\pi, \phi_6 = \frac{\pi}{4}, \ldots$$

for unit cells 15 from #1 to #20 with $\Delta d$=56 mm, H(y) needs to be programmed locally, one unit cell by one unit cell, based on equation (11). In experimental testing, each unit cell 15 in the metasurface has an independent circuit control system 17 with a microcontroller 23 and analog circuits connected to two sensors S1, S2 and actuator 13, as shown in FIG. 4(c). The transfer function H of each unit cell defining the ratio of the output signal applied on the actuator to the input signal on the microcontroller is then locally programmed by both coding the microcontroller and tuning the potentiometer in the voltage amplifier connected to the actuator. In particular, the amplification factor $C_0$ in the transfer function is determined through proper combinations of amplification ratios in charge and voltage amplifiers in the analog circuits. The term, ($e^{i\phi}$–1), in the transfer function H is implemented in the microcontroller, where the phase change is produced through coding the time delay between input and output signals of the microcontroller. The time delay in ADC, DAC, sampling and low-pass filters are also considered in the program. During the first three time intervals [see FIGS. 5a-5c], a uniform $\Delta d$ is prescribed and changed from 98 to 70 and then to 56 mm, through coding the term, ($e^{i\phi}$–1), in each of the microcontrollers 23 of the 20 metasurface unit cells 15. By programming phase profiles of the metasurface, the refraction angle of the transmitted wave can be steered from 33° to 50° and then to 72° in real time. The plots show that numerical and experimental results agree well and that steering angles coincide. Moreover, the possibility for programming nonlinear phase profiles offers the possibility to steer the transmitted ray paths according to curved trajectories. All other things being equal, in the fourth time interval, the phase profile along the metasurface is changed from a linear one to the one given by $$\phi = \frac{\pi a^2}{2\lambda} \ln\left[y + \sqrt{y^2 + (a^2/4)^2}\right]$$

with a=18.67 mm in order to realize parabolic transmitted ray paths. In FIG. 5d, numerical and experimental tests demonstrate the phenomenon. Although the real-time tunable wave steering has been demonstrated in acoustics, such extreme examples of real-time control of elastic waves based on simple programmable digital circuits have never been demonstrated before and should offer new possibilities in the field of structural health monitoring and ultrasonic imaging especially in complex heterogeneous structures.

Applicability under oblique incidences including: (1) the amplification factor for the normal incidence $C(\theta=0)=C_0=1/[2\kappa_a\kappa_s A \sin(k\delta_d)]$ is used by ignoring effects of the oblique angles, and a modified control design in the electric system is suggested to exactly compensate the effect of the oblique angle on the metasurface, which will be discussed hereinafter.

Figure 5:
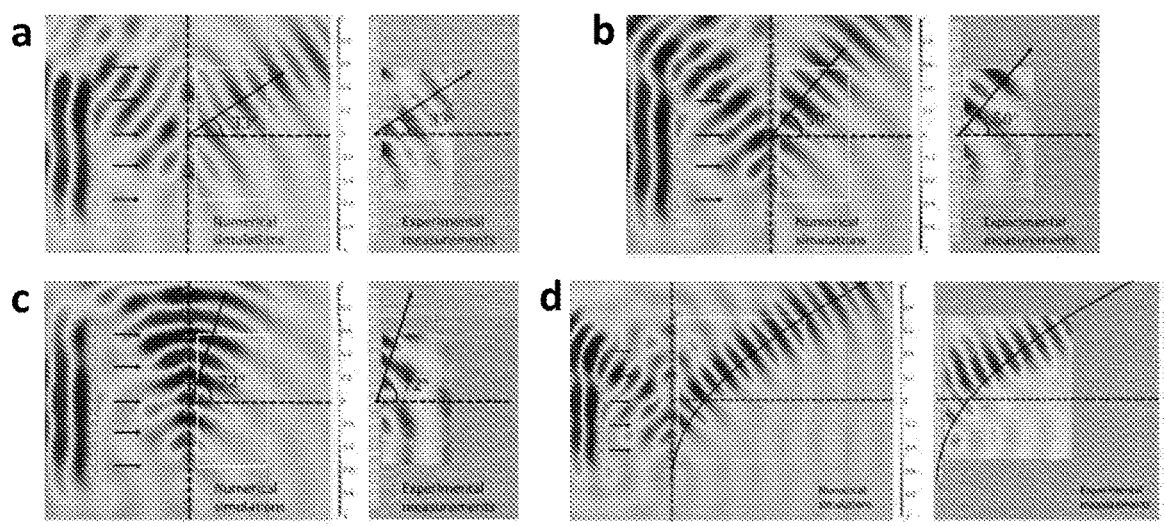
FIGS. 5a-5d illustrate real-time tunable steering of elastic rays in a substrate in accord with the present disclosure, where these FIGS. are numerically simulated and experimentally measured out-of-plane velocity fields manipulated by the metasurface of the present disclosure programmed with different phase profiles during different time intervals.
Figure 6:
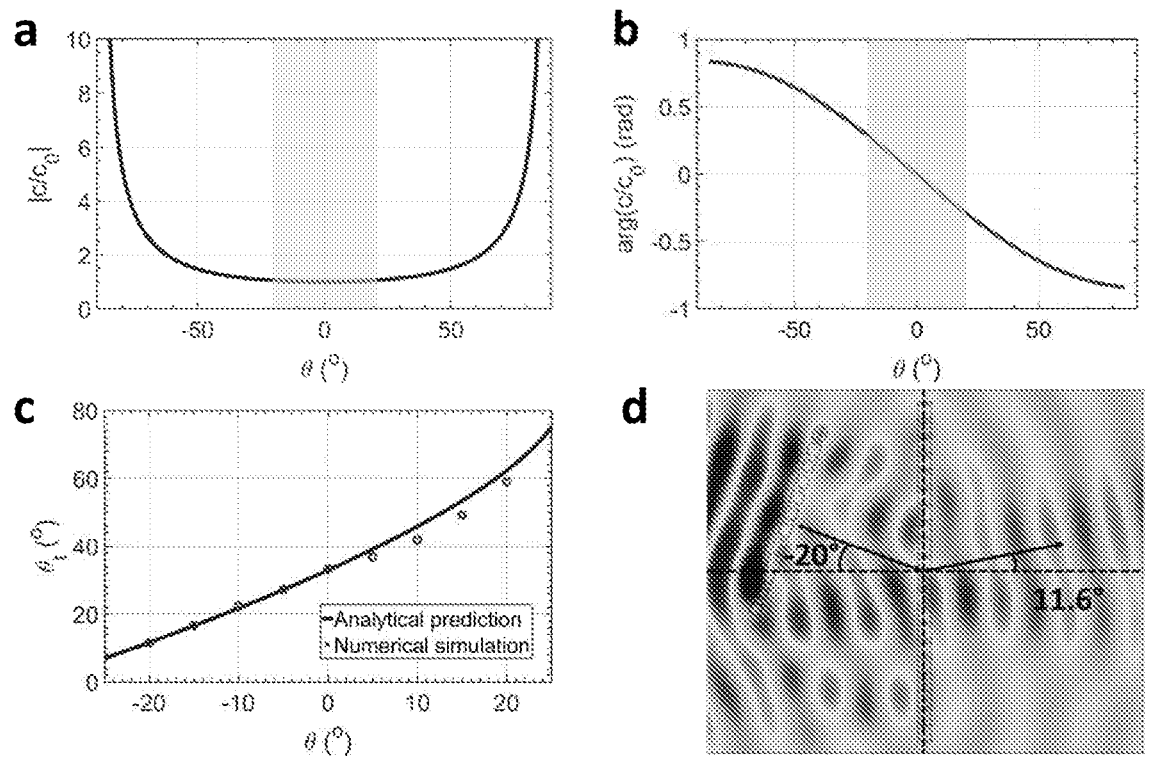
FIGS. 6a, 6b illustrate the applicability of the programmable metasurface of the present disclosure with the amplification factor $C=C_0$ under oblique incidences, where the amplitude and phase angle of $C/C_0$ under different incident angles.
FIG. 6c is a comparison of numerically calculated and analytically predicted refractive angles of transmitted waves of a metasurface of the present disclosure under different incident angles, where the amplification factor $C=C_0$.
FIG. 6d illustrates a numerically simulated out-of-plane displacement wave field manipulated by the metasurface with the amplification factor $C=C_0$ under −20° incidence.

First, the dependence of the amplification factor C on the oblique incidence is investigated for the proposed metasurface 1 in FIG. 5 by quantitatively calculating the amplitudes and phase angles of $C/C_0$ with different incident angles as shown in FIGS. 6a and 6b, respectively. It is seen that when the incident wave angle is between –20° to 20° (the shaded areas in FIGS. 6a and 6b), variations of both the amplitude and phase angle of $C/C_0$ are very small, indicating a weak dependency of the internal amplification factor C on small incident angles. This also implies that the amplification factor $C_0$ could be robust for small angles of incidence by ignoring incident angle effects. Then, the wave steering performance of the proposed metasurface with the internal amplification factor $C=C_0$ are quantitatively evaluated for different oblique incidences as shown in FIG. 6c, where the controlled phase profile along the metasurface is the same as those in FIG. 5a. It is found that numerically calculated refracted angles have a very good agreement with values analytically predicted according to the generalized Snell's law, when the oblique incident angle is between –20° to 20°. The out-of-plane displacement wave field manipulated by the metasurface with the amplification factor $C=C_0$ is also shown in FIG. 6(d) under –20° incidence. For this case, the steered wave field is continuous with all the wave energy in the desired direction. Therefore, it can be concluded that the metasurface with amplification factor $C=C_0$ should be applicable for the oblique incidences from –20° to 20°.

Programmable Metasurface with an Amplification Factor Considering Incident Angles For large angles of incidences, the incident angle should be considered in transfer functions. To better serve this purpose, a modified electrical control system, as indicated at 25 and as shown in FIG. 7a can automatically determine the incident angle by the unit cells 15 themselves is proposed and examined numerically. In the modified design, the electrical system 25 includes additional connection from the sensing pair at the other side of the actuating patch. In this way, one sensing pair will be shared by two adjacent unit cells, and one microcontroller will have two input signals, $V_{in1}$ and $V_{in2}$, from which the incident angle of a harmonic incident wave is determined as $$\theta = \arcsin\left[\frac{\arg(V_{in1}) - \arg(V_{in2})}{kb_m}\right], \quad (12)$$

and will be used in the amplification factor C in equation (10).

Figure 7:
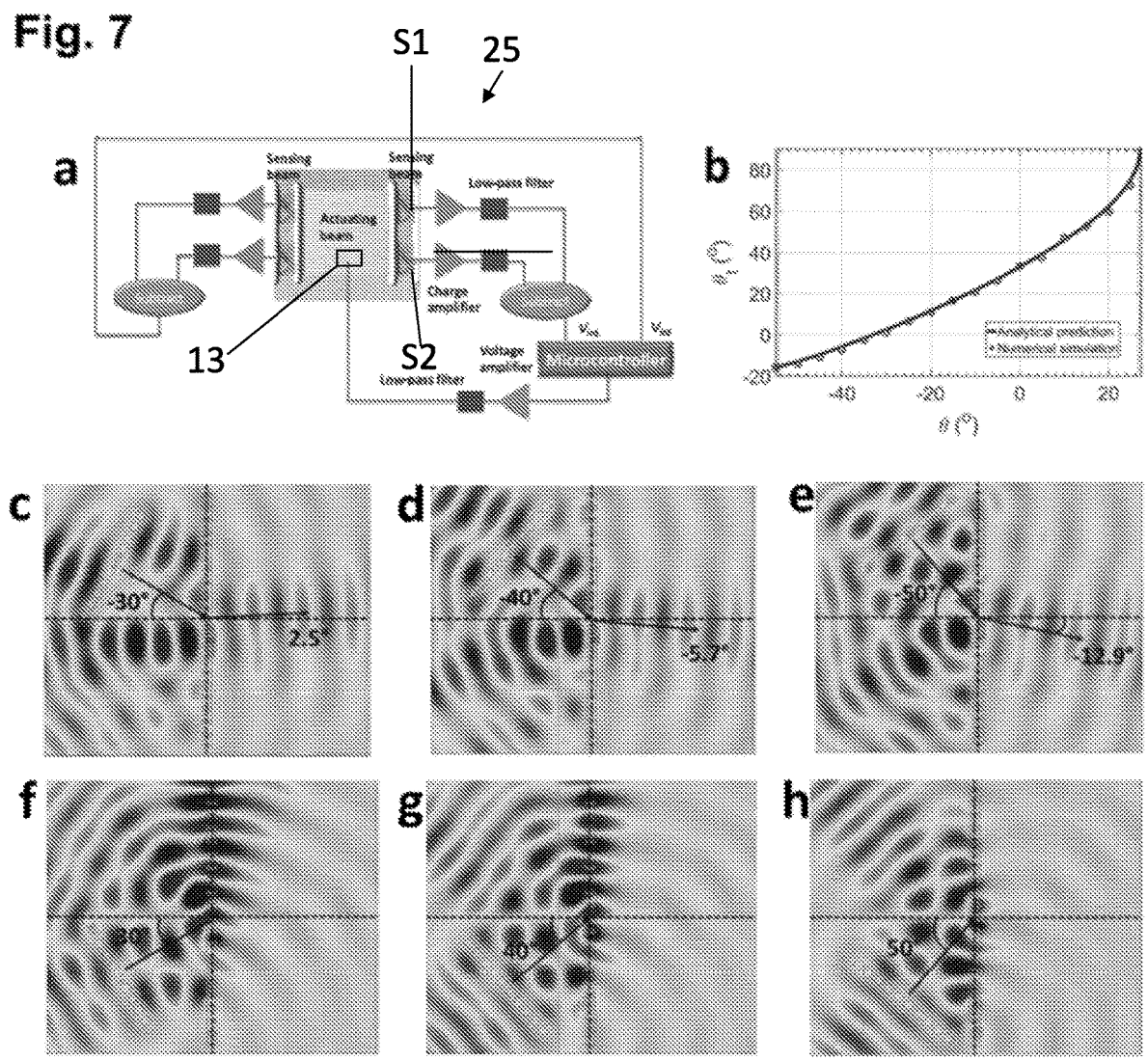
FIG. 7a is a schematic of a modified programmable control system in accord with the present disclosure for controlling a metasurface with an amplification factor C for large-angle incidences.
FIG. 7b illustrates a comparison of numerically calculated and analytically predicted refractive angles of transmitted waves of the modified metasurface with the amplification factor C under different oblique incidences.
FIGS. 7c-7h, respectively, illustrate numerically simulated out-of-plane displacement wave fields manipulated by the modified metasurface with the amplification factor C under respective incidences of −30°, −40°, −50°, 30°, 40° and 50°.

To validate the design, wave steering performances of the modified metasurface under the oblique incidences in the range from −55° to 55° were examined, which is comparable to the ranges investigated in state-of-the-art passive acoustic or elastic metasurfaces. FIG. 7b shows the numerically simulated and analytically predicted refractive angles of the modified metasurface with the internal amplification factor C under the same phase profile in FIG. 5a. Good agreement is shown from −55° to 25°. The out-of-plane displacement wave fields manipulated by the modified metasurface are also illustrated in FIGS. 7c, 7d and 7e under −30°, −40° and −50° incidences, respectively. As shown in the FIG. 7, the transmitted energy is substantially steered to their desired directions, which is predicted by the generalized Snell's law.

In addition, the out-of-plane displacement wave fields under 30°, 40° and 50° incidences were investigated in FIGS. 7f-7h, respectively. It was found that under the same phase profile in FIG. 5a, the transmitted waves in all three cases become purely figures indicating that only the fundamental order mode is preserved and is totally reflected. In contrast, passive designs cannot operate for wave blocking in this regime as they usually generate higher order refracted waves. However, all the higher order refractive waves are suppressed by our programmable metasurface.

Broadband Tunability

While operating at a subwavelength scale, the metasurface of the present disclosure does not suffer from any frequency limitations. Note, however, that the programmed transfer functions are themselves frequency-dependent since the electromechanical coupling coefficient, as well as the wave number, varies with frequency (equation (10)). In particular, FIG. 8a shows the numerically determined profile of the amplification ratio $C_0/A$ of the transfer function with respect to frequency (solid curve). Then, it can be seen that larger amplification ratios are required at lower frequencies than at higher ones, mainly because the electromechanical coupling coefficient $\kappa_s \kappa_a$ and wavenumber k are much smaller at lower frequencies than at higher frequencies. The dependency of the amplification ratio on frequency [see FIG. 8a] can be accurately compensated for by a fourth order function (FIG. 8a, dashed curve). The wave transmittance and phase change induced by the metasurface unit cell with this fitted forth order amplification ratio are shown in FIGS. 8(b) and (c), where the phase φ is prescribed as Tr. It can be seen that the phase jump strictly follows the prescribed values whereas transmittance present some limited fluctuations that will not significantly affect the performance of the metasurface. As an example, ray steering for the case shown in FIG. 5a is demonstrated in FIG. 8d at different frequencies from 5 to 45 kHz, where the refractive angles are in good agreement with the values predicted according to the generalized Snell's law. Therein, the refraction angle is changed due to the dependency of the wavelength on frequency.

Figure 8:
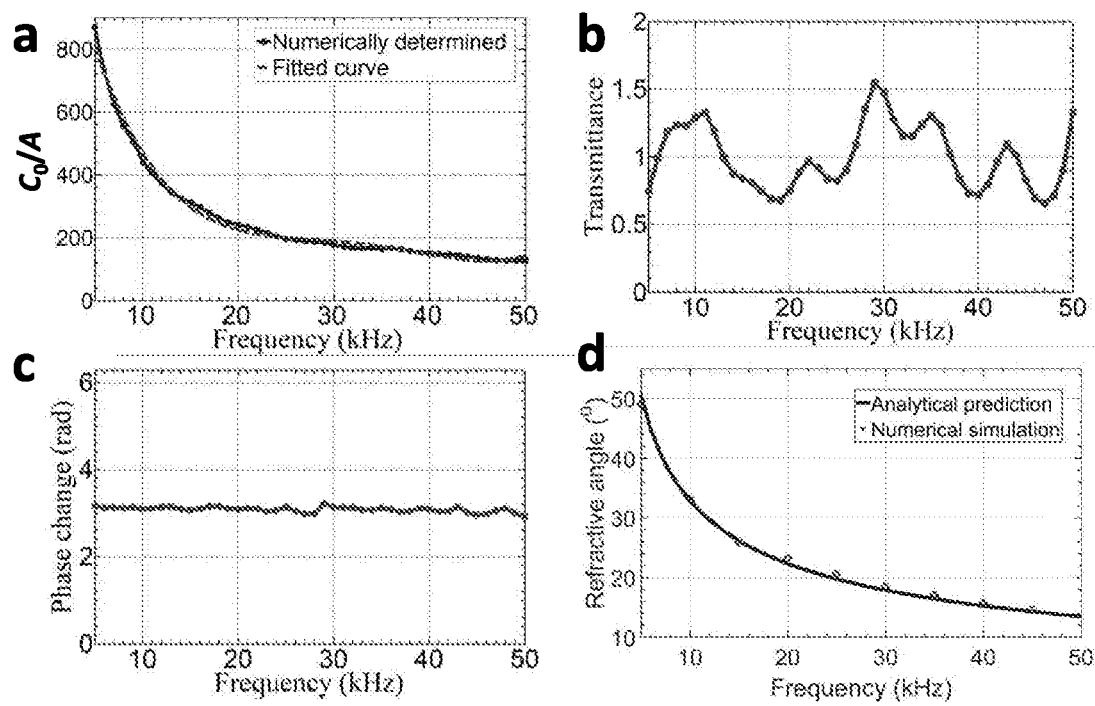
FIGS. 8a-8d illustrate broadband operability of a programmable metasurface of the present disclosure, where FIG. 8a has an amplification ratio of the transfer function, $C_0/A$, determined numerically at different frequencies and is numerically fitted to a fourth order curve, where
Figure 9:
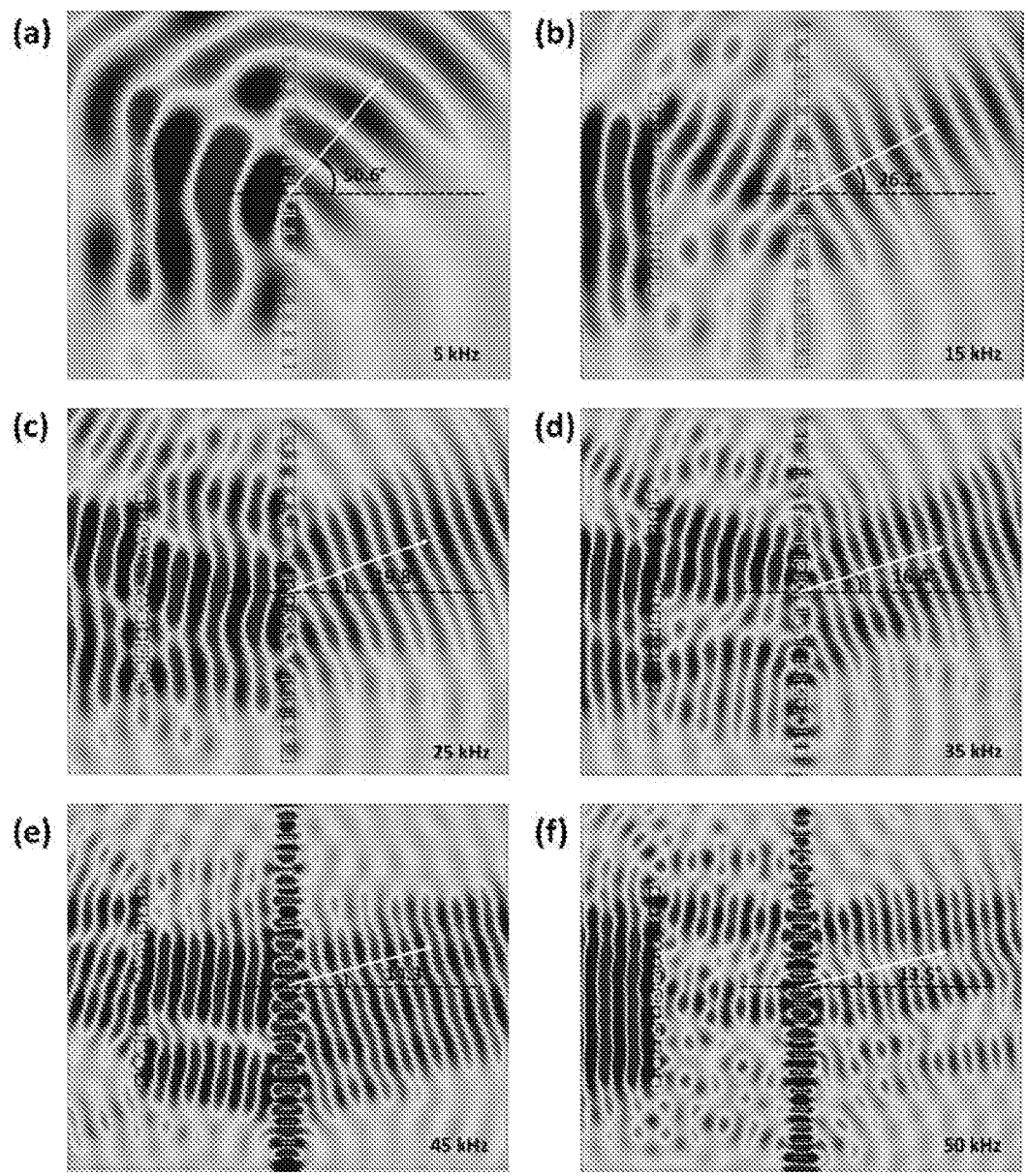
FIGS. 9a-9f illustrate numerically simulated, normalized displacement fields of the wave steering with the programmable metasurface of the present disclosure at different frequencies, where FIG. 9a has a frequency of 5 kHz, FIG. 9b has a frequency of 15 kHz, FIG. 9c has a frequency of 25 kHz, FIG. 9d has a frequency of 35 kHz, FIG. 9e has a frequency of 45 kHz, and FIG. 9f has a frequency of 50 kHz.

Numerically simulated wave fields from 5-50 kHz are also shown in FIG. 9. It can be observed that the programmable metasurface has satisfactory wave steering performance for frequencies below or around 45 kHz (FIGS. 9a-e). In these cases, the numerical results agree very well with the analytically predicted refraction angles (white arrows). It must be noted that the wave steering performance at 50 kHz (FIG. 9(f)) is slightly degraded as wavelengths become comparable to the thickness of the metasurface. Going beyond 50 kHz will necessitate the use of a metasurface by reducing the size of the unit cell. It should be noted that the results presented in FIGS. 8 and 9 are for the single frequency cases sweeping over a range of frequencies. Most of literatures claiming broadband metasurfaces are based on the extrapolation of multiple narrow-band experimental or numerical results. The linear character of the flexural waves then allows us to safely claim that our metasurface can operate for broadband signals as long as their bandwidth is supported by the range 5-45 kHz. However, in practice, it should be recognized that there may be some difficulties to realize the transfer function H experimentally with the current hardware for broadband wave signals. As addressed before, the amplification factor $C_0$ in the transfer function H should be a fourth-order function of the frequency (FIG. 8a), which can be coded into microcontrollers in the control systems 15 through appropriate IIR filters. It was experimentally found that the sample frequency of the current microcontrollers was lowered to 41.6 kHz, which makes it impossible for the signal processing in the frequency range of interest to the metasurface.

Multifunctional Transfer Functions

Figure 10:
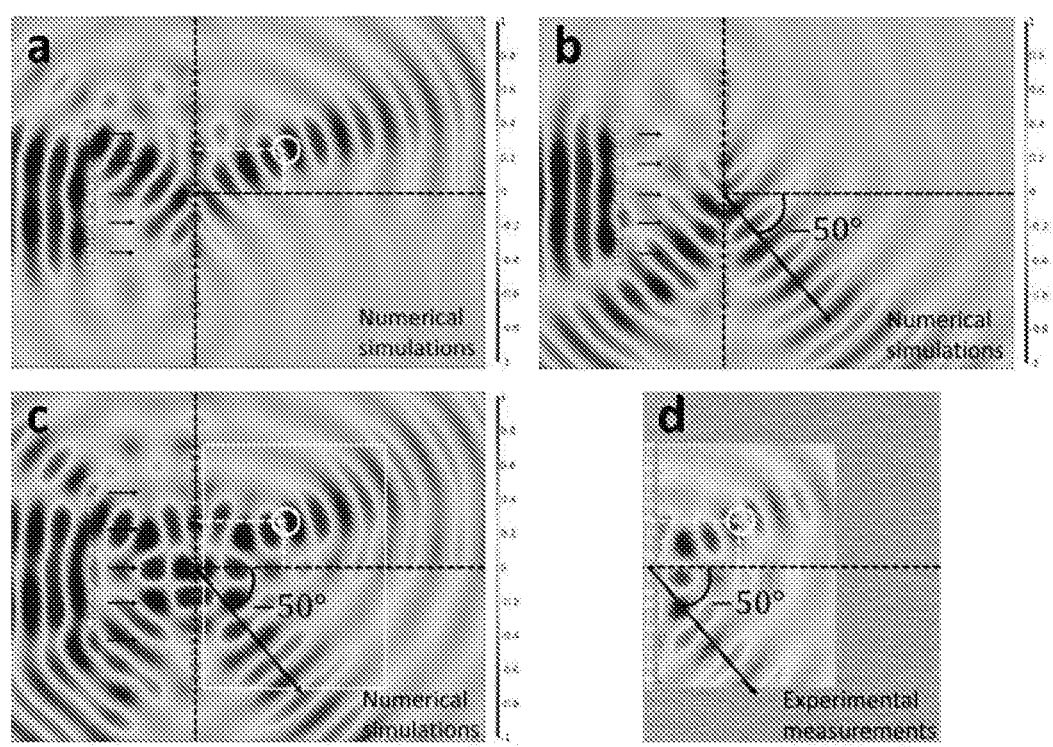
FIGS. 10a and 10b illustrate focusing and steering, respectively, of the wavefront using simulated normalized out-of-plane displacement fields manipulated by a metasurface of the present disclosure encoded with single phase profile functions, where
FIGS. 10c, 10d illustrate numerically simulated and experimentally measured out-of-plane velocity fields manipulated by a metasurface of the present disclosure encoded with the superposition of the focusing and steering transfer functions of FIGS. 10a and 10b, where wave focusing and steering are then achieved simultaneously, and where

Those skilled in the art will appreciate that the functionalities of the programmable metasurface 1 of the present disclosure can be superposed by appropriately "summing" the transfer functions of each functionality, as those demonstrated in acoustics. Given the phase profile necessary for steering $\phi^{(1)}$ specified for Δd=70 mm, wave focusing can be achieved thanks to another phase profile $$\phi^{(2)} = \frac{2\pi}{\lambda}\left[\sqrt{x_0^2 + (y - y_0)^2} - x_0\right],$$

where $x_0$ and $y_0$ are the coordinates of the focal point (white the circle on FIG. 10a; therein $x_0$=100 mm and $y_0$=50 mm). Numerical results shown in FIGS. 10a and 10b confirm that each of these profiles achieve its intended functionality predicted analytically. Now, by combining the two phase profiles into a single new transfer function H=C($e^{i\phi^{(1)}}$+$e^{i\phi^{(2)}}$−1), wave focusing and steering can be achieved simultaneously in order to, say, form two images, one close and one distant, of one source. FIGS. 10c and 10d demonstrate the simulated and experimentally measured wave fields with the new transfer function. It is found that the incident wave can be focused and steered, simultaneously, without any fading. Here, the extra elastic energy generated is extracted from the electric infrastructure. Programmed electrical and elastic power exchange can be utilized in other cases of elastic wave control as well.

Enhanced Imaging of a Point Source

Figure 11:
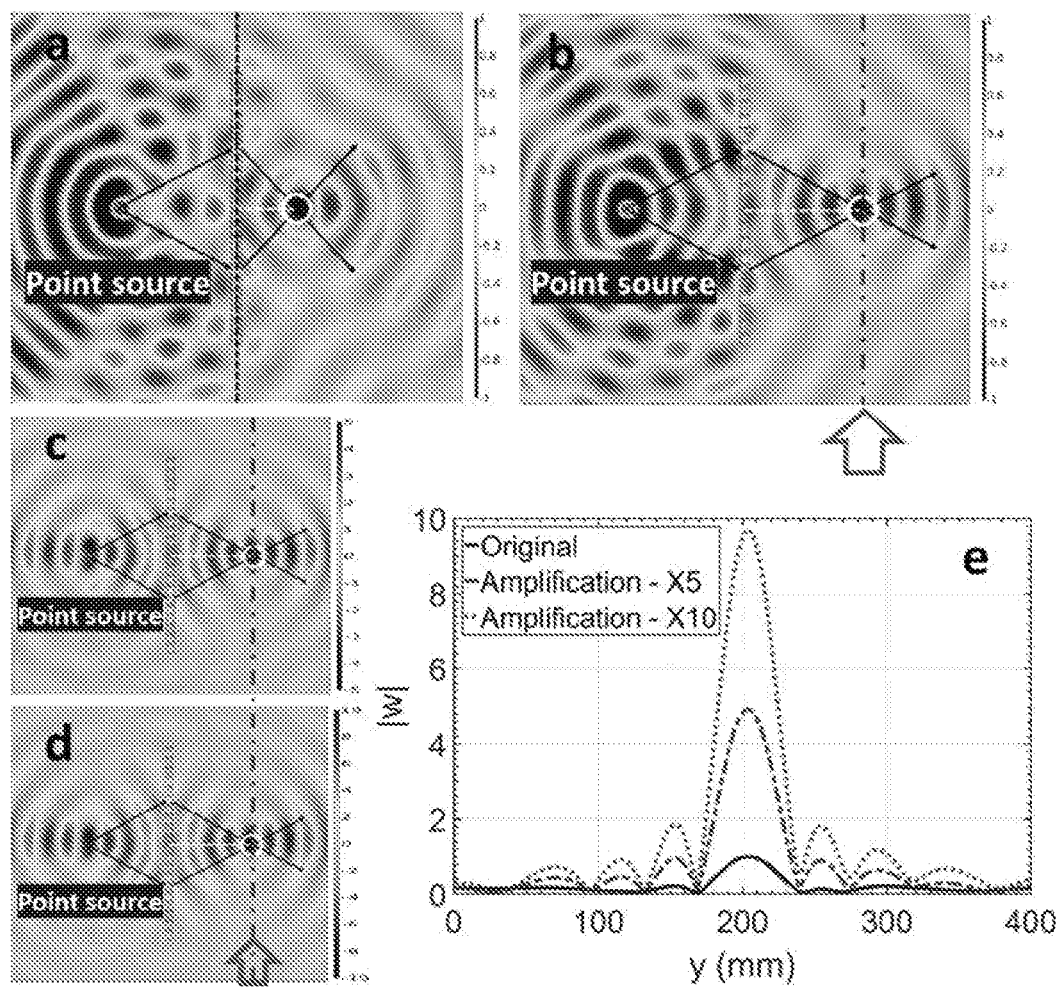
FIGS. 11a-11e are plots of the use of a programmable metasurface of the present disclosure for enhanced imaging of a point source with normalized displacement of the wave field of the point imagining where FIGS. 11a, 11 b are at different locations, 60 and 120 mm., respectively, without amplifications, where

By leveraging other transfer functions that channel more electrical energy, the convergent field can be amplified so as to enhance the intensity of the image. By combining both phase and amplitude engineering, made possible by the degrees of freedom of the transfer function, tunable enhanced imaging of a point source is numerically demonstrated. First, with unitary transmittance, consider the same focusing phase profile as before. The image distance to the metasurface is given by parameter $x_0$ and is changed from 60 to 120 mm on FIGS. 11a and 11b, respectively, thus illustrating how the image position can be tuned. By defining a new transfer function $H=\gamma Ce^{i\Phi}-C$, the wave transmittance and image intensity will become controllable. For example, in FIGS. 11c and d, we select $\gamma$ to be 5 and 10, respectively, to enhance the image by 5 and 10 times the original one shown in FIG. 11(b). The normalized out-of-plane displacement field shown in the FIGS. 11c and 11d demonstrate the desired enhancement. In FIG. 11e, we extract the magnitude of the normalized out-of-plane displacement field at x=120 mm (imaging spot). It is seen then that the image intensity is indeed increased nearly to the exact prescribed value.

Non-Reciprocal Wave Propagation

Figure 12:
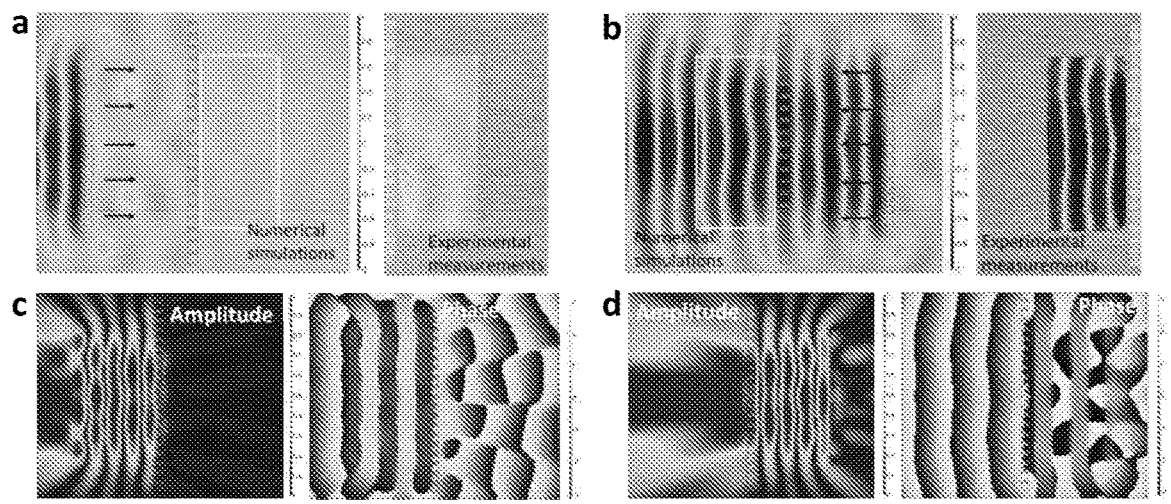
FIGS. 12a-12d are images of one-way wave transmission where

As another demonstration of the extreme functionalities that the proposed metasurface can achieve, a thin one-way transmitter of flexural waves is realized for the first time. As a matter of fact, the sensing signal, Vin, being dependent on the wave vector, can be designed to break spatial symmetry and reciprocity. For instance, the metasurface can be programmed to block waves incident from the left while transmitting, or even amplifying, waves incident from the right. Other techniques for breaking reciprocity make use of so-called "dynamic materials" where the constitutive properties need to be constantly changing with time across a depth of multiple wavelengths throughout the bulk of the host medium. In comparison, the suggested metasurface appears as an appealing thin, broadband and reprogrammable substitute. Going into specifics with normal incidences, for the right-going wave, by subtracting the right sensor signal from the left sensor signal, the sensing signal is $V_{in}=-2i\kappa_s Aw_0 \sin(k\delta_d)$. However, for the left-going wave, the sensing signal is $V_{in}=2i\kappa_s Aw_0 \sin(k\delta_d)$, which is out-of-phase with the sensing signal from the right-going wave. Therefore, by adopting the same transfer function, $$H = \frac{1}{2\kappa_a \kappa_s A \sin(k\delta_d)},$$

the coherent wave fields generated by the actuator in the metasurface will be different: $w_a=-w_0 e^{-ikx}$ in the right-hand-side of the metasurface for right-going incidence; and $w_a=w_0 e^{-ikx}$ in the left-hand-side of the metasurface for left-going incidence. As a consequence, the right-going wave will be blocked ($w_t=0$) and the left-going wave is amplified ($w_t=2w_0 e^{-ikx}$) with an amplitude twice that of the incident wave. Experimental and numerical tests confirm the predicted one-way transmission phenomenon and show good agreement on transmitted waves [see FIGS. 12a and 12b]. For the case with the right-going incident wave, a standing wave is formed in the region between the source and metasurface. FIG. 12c shows the numerically calculated amplitude and phase of the displacement for this case, where node points and phase jumps of $\pi$ are clearly seen. In addition, the wave field in the right-hand-side of the source array in FIG. 12b is approximately expressed as $w_0 e^{ikx}(1+e^{i\varphi})$ by summing the incidence and actively-excited waves from the metasurface, where the phase factor $\varphi$ is determined by the distance between the source and the metasurface, L, and the wavenumber, k, as $\varphi=2kL$. In this example, L=120 mm, and k=118 1/m. Finally, $\varphi=9\pi$, producing a near zero wave field in this region, as also shown in FIG. 12d for the amplitude and phase of the displacement.

The description herein is merely exemplary in nature and, thus, variations that do not depart from the gist of that which is described are intended to be within the scope of the teachings. Moreover, although the foregoing descriptions and the associated drawings describe example embodiments in the context of certain example combinations of elements and/or functions, it should be appreciated that different combinations of elements and/or functions can be provided by alternative embodiments without departing from the scope of the disclosure. Such variations and alternative combinations of elements and/or functions are not to be regarded as a departure from the spirit and scope of the teachings.

The invention claimed is:

1. A programmable metasurface with real-time tunable elastic ray control comprising a substrate having a plurality of slits therein with regions between the slits forming alternating actuating beams and sensing beams, one of said actuating beams and one of said sensing beams with one of said slits therebetween constituting a unit cell, there being one or more of said unit cells, said sensing beam of each said unit cell having a first sensor and a second sensor operatively coupled to said sensing beam for sensing one or more incident elastic waves induced by an external source and generating an output signal corresponding to vibrations of said sensing beam, the output signals of said sensors of a unit cell being connected to a control circuit, the output of said control circuit driving an actuator that is operatively coupled to the actuating beam of said unit cell for forming a coherent elastic wave within said substrate which in turn induces vibrations in said sensing beam of said unit cell, said control circuit determining the difference between the signals from each of said sensors and generating an output signal for driving said actuator, said control circuit having a microcontroller controllable so as to vary the wave amplitude and/or the phase of the one or more incident elastic waves after passing through said unit cell.

2. A programmable elastic metasurface comprising a substrate plate having a plurality of slits therein defining a plurality of self-sensing and self-actuating unit cells, each unit cell comprising an actuating beam, a sensing beam, and one of said slits therebetween, said actuating beam having a piezoelectric actuator operatively coupled thereto which when energized generates a coherent flexural wave in said substrate plate, said sensing beam having a pair of piezoelectric sensors operatively coupled thereto for sensing incident flexural waves induced by an external source, each of said sensors generating a sensing signal, said incident flexural wave having an amplitude and a phase at the location of each said unit cell that are changed after passing through said metasurface unit cell, a control circuit for controlling energization of said actuating beam actuator where the control circuit receives signals from said sensing beam sensors corresponding to the flexural waves induced by the external source in said substrate plate and by said piezoelectric actuating beam actuator in said metasurface, said control circuit taking the difference between the signals from each of said sensing beam sensors so as to substantially eliminate flexural wave signals induced by said actuating beam actuator in the metasurface and to obtain an incident flexural wave signal induced by the external source on said substrate plate, said control circuit generating a desired actuating signal for varying the actuation of said actuating beam actuator so as to change the amplitude and phase of said incident flexural wave to desired values of the flexural wave generated by said external source in said substrate plate after passing through the metasurface, said control circuit comparing the last-said desired actuating signal to said difference between said pair of sensing signals and a desired electrical transfer function thereby to result in the metasurface being able to perform its desired function.

3. A programmable elastic metasurface as set forth in claim 2 wherein said control circuit includes a microcontroller that receives said signals from said sensing beams sensors and varies said output signal to said actuator on said actuating beam to change the flexural wave generated in said substrate plate by said actuating beam.

4. A programmable elastic metasurface as set forth in claim 3 wherein said microcontroller may be adjustably programmed to vary the flexural wave generated in said substrate plate to better conform to said desired wave transmittance and phase profile.

5. A programmable elastic metasurface as set forth in claim 4 wherein said microcontroller is responsive to outside communications that enable the waveform generated in the metasurface to be tuned so as to achieve a different functionality from that for which is was originally programmed.

6. A programmable elastic metasurface as set forth in claim 5 wherein said outside communication with said microcontroller is via a wireless communication link.

7. A programmable elastic metasurface as set forth in claim 5 wherein the wave transmittance and phase profile of said waveform formed in said metasurface may be varied from said one desired wave transmittance and phase profile to another desired wave transmittance and phase profile.

8. A programmable elastic metasurface as set forth in claim 7 whereby the output signal from said microcontroller is configured to be varied in substantially real-time so that the waveform generated in said metasurface by said actuator may be adjustably tuned so as to result in real-time tunable wave steering and curvilinear trajectory adjustment.

9. A programmable elastic metasurface as set forth in claim 7 wherein said metasurface is programmed to block waveforms in said substrate in a given direction while amplifying waveforms incident in the opposite direction so as to result in mechanical diode.

10. A programmable elastic metasurface as set forth in claim 2 wherein for one of said unit cells said sensors of its respective said sensing beam extracting a background incident wave signal from said flexural wave, and wherein said control circuit has a feedforward control loop, which controls the phase and amplitude of the signal transmitted to said actuator.

11. A programmable elastic metasurface as set forth in claim 10 wherein for a unit cell the output signals of said sensors are filtered and are subtracted from one another such that the contribution of a generated coherent wave is eliminated and such that only the contribution of background incident signal remains.

12. A programmable elastic metasurface as set forth in claim 10 wherein said unit cells are arranged in a row wherein said subtraction substantially eliminates inter- and intra-cell actuator-to-sensor feedback effects such that said metasurface can be programmed locally unit cell by unit cell.

13. A method of programming an elastic metasurface comprising the steps of:
   a. Providing a substrate plate having a plurality of slits therein defining a plurality of unit cells, each unit cell having an actuating beam and a sensing beam with a slit therebetween;
   b. For each said unit cell, providing a piezoelectric actuator on each said actuator beam where said actuator is operatively coupled to its respective said actuator beam which when energized generates a coherent flexural wave in said substrate plate, said flexural wave having an amplitude and a phase at each unit cell location that are changed after passing through said unit cell;
   c. For each said unit cell, providing a pair of piezoelectric sensors operatively coupled to its respective said sensing beam for sensing incident flexural waves induced by an external force with each of said sensors generating a respective sensing signal;
   d. Providing a control circuit for each said unit cell for controlling energization of a respective said actuating beam actuator where the control circuit receives signals from said sensing beam sensors corresponding to the flexural wave induced in said metasurface by said external source in said substrate plate and by said actuating beam actuator;
   e. Said control circuit generating an actuator signal for varying the amplitude and phase of said flexural wave in said substrate plate; and
   f. Said actuating signal generated by said control circuit is a comparison of the immediately preceding actuating signal to the difference between said sensing signals and a desired electrical transfer function thereby to result in the metasurface being able to perform its desired function.

\* \* \* \* \*